United States Patent
Salami et al.

(10) Patent No.: US 11,618,715 B2
(45) Date of Patent: *Apr. 4, 2023

(54) ASH-CONTAINING CONCRETE COMPOSITION

(71) Applicant: KING FAHD UNIVERSITY OF PETROLEUM AND MINERALS, Dhahran (SA)

(72) Inventors: Babatunde Abiodun Salami, Dhahran (SA); Megat Azmi Megat Johari, Dhahran (SA); Mohammed Maslehuddin, Dhahran (SA); Zainal Arifin Ahmad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,918

(22) Filed: Aug. 17, 2021

(65) Prior Publication Data
US 2021/0371343 A1 Dec. 2, 2021

Related U.S. Application Data

(63) Continuation of application No. 16/533,014, filed on Aug. 6, 2019, now Pat. No. 11,174,202.

(51) Int. Cl.
C04B 28/26 (2006.01)
C04B 7/44 (2006.01)
C04B 14/06 (2006.01)

(52) U.S. Cl.
CPC ............ C04B 28/26 (2013.01); C04B 7/44 (2013.01); C04B 14/06 (2013.01); C04B 2201/50 (2013.01)

(58) Field of Classification Search
CPC .......... C04B 7/44; C04B 14/06; C04B 18/02; C04B 18/087; C04B 26/00; C04B 26/003; C04B 28/26; C04B 2201/50; Y02A 30/30; Y02W 30/91
See application file for complete search history.

(56) References Cited

U.S. PATENT DOCUMENTS

| 9,597,818 B2 | 3/2017 | Abdullah |
| 9,834,479 B2 | 12/2017 | Gong |
| 11,174,202 B2 * | 11/2021 | Salami .................. C04B 18/101 |
| 2012/0156381 A1 | 6/2012 | Allouche et al. |
| 2013/0260043 A1 | 10/2013 | Abdullah et al. |
| 2021/0371341 A1 * | 12/2021 | Salami .................. C04B 28/021 |
| 2021/0371342 A1 * | 12/2021 | Salami .................... C04B 28/26 |
| 2021/0380485 A1 * | 12/2021 | Salami .................... C04B 28/26 |

FOREIGN PATENT DOCUMENTS

| CN | 106277980 B | 10/2018 |
| WO | 2018/028225 A1 | 2/2018 |

OTHER PUBLICATIONS

Salami, et al. ; POFA-Engineered Alkali-activated Cementitious Composite Performance in Acid Environment ; Journal of Advanced Concrete Technology ; Nov. 2017 ; 18 Pages.
Yusuf, et al. ; Performance of Different Grades of Palm Oil Fuel Ash with Ground Slag as Base Materials in the Synthesis of Alkaline Activated Mortar ; Journal of Advanced Concrete Technology, vol. 12 ; pp. 378-387 ; 2014 ; 12 Pages.
Yusuf, et al. ; Impacts of Silica modulus on the Early Strength of Alkaline Activated Ground Slag-Ultrafine Palm Oil Fuel Ash Based Concrete ; Materials and Structures, vol. 48, No. 3 ; Apr. 2014 ; 12 Pages.
Salami, et al. ; Performance of POFA-Based Alkali-Activated Mortar Exposed to Elevated Temperatures ; International Journal of Current Science, Engineering & Technology ; Mar. 2018 ; 8 Pages.
Liu, et al. ; Utilization of Palm Oil Fuel Ash as Binder in Lightweight Oil Palm Shell Geopolymer Concrete ; Advances in Materials Science and Engineering, vol. 2014 ; Jan. 9, 2014 ; 5 Pages.
El-Hassan, et al. ; Effect of process parameters on the performance of fly ash/GGBS blended geopolymer composites ; Journal of Sustainable Cement-Based Materials ; Dec. 5, 2017 ; 21 Pages.

* cited by examiner

*Primary Examiner* — Anthony J Green
(74) *Attorney, Agent, or Firm* — Oblon, McClelland, Maier & Neustadt, L.L.P.

(57) ABSTRACT

A concrete composition that includes (i) a treated palm oil fuel ash, wherein the treated palm oil fuel ash is the only binder present, (ii) a fine aggregate, (iii) a coarse aggregate, and (iv) an alkali activator containing an aqueous solution of sodium hydroxide and sodium silicate. A cured concrete made from the concrete composition is also disclosed with advantageous compressive strength properties.

7 Claims, 3 Drawing Sheets

Fig. 1

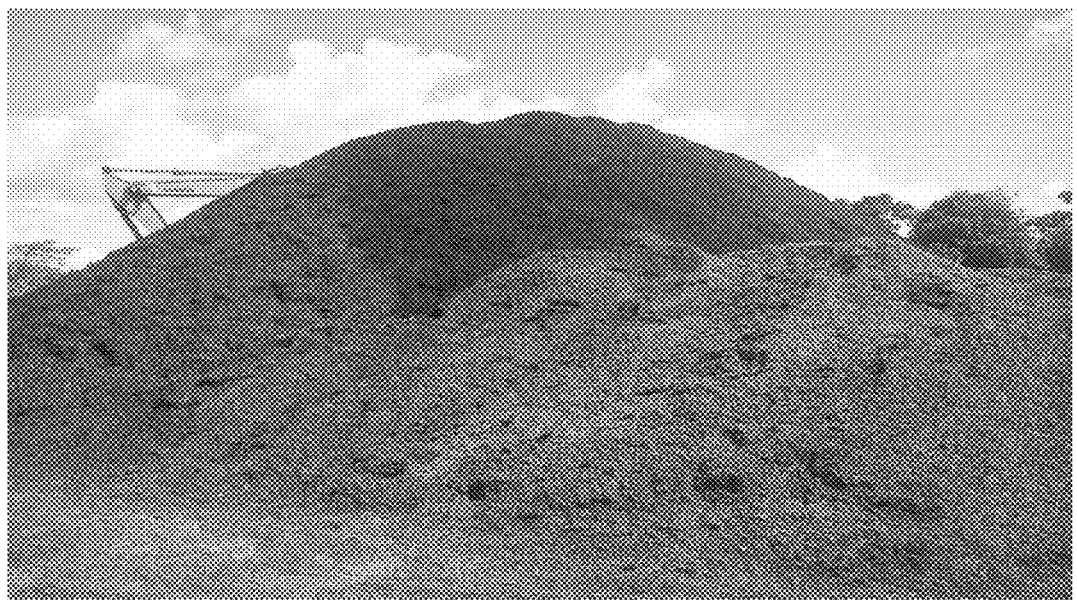

Fig. 2

| Treatment of palm oil fuel ash (POFA) |
|---|
| Collection of raw POFA from Nibong Tebal, Malaysia |
| Drying of POFA (e.g., at 105 °C for 24 h) to remove any inherent moisture |
| Sieving (e.g., through 300 μm sieve) to remove coarse and unwanted materials |
| POFA passing through e.g., 300 μm sieve ground in ball mill (e.g., for 6 h) |
| Heat treatment of ground POFA (e.g., at 550 °C for 2 h) to reduce carbon content and prevent glass crystallization |
| Re-grinding in ball mill (e.g., for 6 h) to form treated palm oil fuel ash (TPOFA) |
| Characterization of treated palm oil fuel ash (TPOFA) e.g., using XRD, XRF |
| Selection of TPOFA to produce POFA-engineered cementitious composite (POFA-EACC) |

ASH-CONTAINING CONCRETE COMPOSITION

CROSS-REFERENCE TO RELATED APPLICATIONS

The present application is a Continuation of U.S. application Ser. No. 16/533,014, now U.S. Pat. No. 11,174,202, having a filing date of Aug. 6, 2019.

BACKGROUND OF THE DISCLOSURE

Technical Field

The present disclosure relates to alkali-activated concrete compositions that include palm oil fuel ash, and cured concrete made therefrom.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

According to guidelines of the Intergovernmental Panel on Climate Change (IPCC) and other agencies of the United Nations, mitigating $CO_2$ emissions is a top priority for combating rising global average temperatures. One of the practical and sustainable means to achieve the limits set for the global average temperature at the UN conference of parties (COP23) is for the cement industry to lower the production of Portland cement and to develop an economically- and environmentally-friendly substitute. $CO_2$ is a byproduct produced during the production of Portland cement, specifically during the formation of clinker (intermediate product) using elevated temperatures inside a kiln, where calcium carbonate from calcium-rich material is converted into lime and $CO_2$. In fact, in 2015, Portland cement generated around 2.8 billion tons of $CO_2$, equivalent to 8% of the total $CO_2$ generated globally. The high levels of $CO_2$ emitted from cement production is only expected to worsen as global urbanization and economic development increase with higher demand for new buildings and infrastructure.

Therefore, the cement industry has begun research into energy efficient cementitious materials to replace cements such as ordinary Portland cement (OPC), encouraged by changes in policy, technology, and new opportunities to raise profits and cut costs through decreasing greenhouse gas emissions. However, only limited progress has been made so far.

One type of technology being explored is alkali-activated concrete (AAC) using aluminosilicate binders having pozzolanic behavior, owing in part to the vast aluminosilicate material options. AAC is produced using a binder generated from the reaction between aluminosilicate precursor and a highly alkaline solution, which results in little energy dissipation during production. Many binding materials have been used in alkali activated concretes, such as metakaolin, fly ash, natural pozzolan, and other materials generated from industrial and agricultural activities, such as blast furnace slag and rice husk ash.

Another of these aluminosilicate materials is palm oil fuel ash (POFA), an agricultural waste material produced from the burning of palm fibers, empty fruit bunches and kernel shells. The ash produced after burning of these waste materials (POFA) has been historically disposed of indiscriminately in landfills, causing lost profits and health concerns to nearby inhabitants. Vast volumes of POFA are produced in Malaysia, Thailand and Indonesia. In fact, global palm oil production has increased from 15.2 million tons in 1995 to 54 million tons in 2012 and it is expected to grow by more than 25% by 2020 to a global level of more than 68 million tons (European Palm Oil Alliance, 2014). Therefore, finding constructive and profitable uses for the major waste byproduct, POFA, remains of interest. However, the use of POFA as a binding material in cement/mortar has significant challenges. For instance, the chemical composition of POFA is characterized by a high amount of $SiO_2$ (in varying quantities depending on the region and treatment), and low quantities of $Al_2O_3$ and $CaO$, which causes bond formation inadequacies needed for high strength, hampering its implementation as a binder.

As a result, many aluminosilicate materials such as palm oil fuel ash (POFA) have been used as a supplementary cementing material (as a partial replacement of cement), but have not been used as the sole binder (complete replacement for cement) in concrete.

In view of the forgoing, one object of the present disclosure is to provide concrete compositions that contain palm oil fuel ash (POFA), and cured concretes made therefrom with advantageous compressive strength and durability properties. Such concrete compositions may be made with POFA as the only binder material, which has the benefit of reducing POFA waste volumes in landfills, conserving natural materials, and reducing $CO_2$ emissions and energy consumption required for cement manufacture.

BRIEF SUMMARY OF THE DISCLOSURE

Accordingly, it is one object of the present invention to provide concrete compositions containing treated palm oil fuel ash as the only binder material.

It is another object of the present disclosure to provide cured concrete, formed from curing the concrete composition, with a high compressive strength.

These and other objects, which will become apparent during the following detailed description, have been achieved by the inventors' discovery that adequate gradation of a treated palm oil fuel ash binder and aggregate enables the POFA material to be used as a complete replacement for cement such as OPC.

Thus, the present invention provides:

A concrete composition that includes (i) a treated palm oil fuel ash, wherein the treated palm oil fuel ash is the only binder present, (ii) a fine aggregate, (iii) a coarse aggregate, and (iv) an alkali activator containing an aqueous solution of sodium hydroxide and sodium silicate.

In some embodiments, the treated palm oil fuel ash is present in an amount of 20 to 30 wt. %, based on a total weight of the concrete composition.

In some embodiments, the treated palm oil fuel ash is obtained sequentially from drying raw palm oil fuel ash at 80 to 120° C., sieving to a particle size of less than 300 μm, a first mechanical ball milling, calcining at 500 to 600° C., and a second mechanical ball milling.

In some embodiments, the treated palm oil fuel ash has a median particle size ($d_{50}$) of 0.5 to 2.0 μm.

In some embodiments, the treated palm oil fuel ash contains, as constituent oxides, 60 to 72 wt. % $SiO_2$, 4 to 8 wt. % $Al_2O_3$, 3 to 7 wt. % $Fe_2O_3$, 3 to 8 wt. % $CaO$, 1 to 5 wt. % MgO, 3 to 7 wt. % $K_2O$, 0.2 to 0.5 wt. % $SO_3$, 0.1 to 0.25 wt. % $Na_2O$, and 1 to 5 wt. % of $P_2O_5$, each based on a total weight of the treated palm oil fuel ash.

In some embodiments, the treated palm oil fuel ash contains, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, 0.18 to 0.2 wt. % $Na_2O$, and 3 to 4 wt. % of $P_2O_5$, each based on a total weight of the treated palm oil fuel ash.

In some embodiments, the treated palm oil fuel ash has a loss on ignition (LOI) of less 3 wt. %, based on a total weight of the treated palm oil fuel ash, and a specific surface area of 1.4 to 1.6 $m^2/g$.

In some embodiments, a weight ratio of a combined weight of the coarse aggregate and the fine aggregate to the treated palm oil fuel ash is 1:1 to 2:1.

In some embodiments, the fine aggregate has a fineness modulus of 1.8 to 2.1 and a saturated surface dry (SSD) specific gravity of 2.5 to 2.7.

In some embodiments, the coarse aggregate has a saturated surface dry (SSD) specific gravity of 2.4 to 2.6.

In some embodiments, the coarse aggregate has a bimodal particle size distribution with a first mode particle size of 4 to 6 mm and second mode particle size of 2 to 3 mm, and a wherein a weight ratio of coarse aggregate having the first mode particle size to coarse aggregate having the second mode particle size is 1:1 to 3:1.

In some embodiments, a weight ratio of the coarse aggregate to the fine aggregate is 1:1 to 2:1.

In some embodiments, the alkali activator is formed from an aqueous solution of sodium hydroxide having a sodium hydroxide concentration of 10 to 14 mol/L.

In some embodiments, a weight ratio of the alkali activator to the treated palm oil fuel ash is 0.3:1 to 0.7:1

In some embodiments, a weight ratio of sodium silicate to sodium hydroxide is 1:1 to 3:1

In some embodiments, the concrete composition has weight ratio of water to the treated palm oil fuel ash of 0.06 to 0.98.

In some embodiments, the concrete composition consists of the treated palm oil fuel ash, the coarse aggregate, the fine aggregate, sodium hydroxide, sodium silicate, and water.

A cured concrete containing the concrete composition in cured form.

In some embodiments, the cured concrete has a 28-day compressive strength of 33 to 49 MPa.

In some embodiments, the cured concrete has a unit weight of 2200 to 2300 $kg/m^3$.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an image of typical palm oil fuel ash (POFA) dumping site near to palm oil mill;

FIG. 2 is a flowchart for a treatment and production process for making treated POFA (TPOFA) used in the concrete composition;

DETAILED DESCRIPTION OF THE EMBODIMENTS

Figure 3:
FIG. 3 is an image of raw POFA loaded into an oven for drying.

Embodiments of the present disclosure will now be described more fully hereinafter with reference to the accompanying drawings, in which some, but not all of the embodiments of the disclosure are shown.

Definitions

As used herein, the terms "optional" or "optionally" means that the subsequently described event(s) can or cannot occur or the subsequently described component(s) may or may not be present (e.g. 0 wt. %).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

The term "comprising" is considered an open-ended term synonymous with terms such as including, containing or having and is used herein to describe aspects of the invention which may (or may not) include additional components, functionality and/or structure. Terms such as "consisting essentially of" are used to identify aspects of the invention which exclude particular components that are not explicitly recited in the claim but would otherwise have a material effect on the basic and novel properties of the concrete composition in either a dry, wet or cured form. Basic and novel properties of the present disclosure include, but are not limited to, the strength such as compressive strength, curing time, slump, workable flow, and viscosity. The term "consisting of" describes aspects of the invention in which only those features explicitly recited are included and thus other components not explicitly or inherently included are excluded.

As used herein, the term "binder" refers to a composition or substance with one or more constituents that is capable of binding materials together, once set. While a "binder" classically refers to materials or mixtures of materials that are "cements" (e.g., Portland cement), in the present disclosure, a "binder" may be a cement or any other material that is capable of forming cement or capable of forming materials with cement-like binding properties. Therefore, included in the definition of "binder" are those materials that have little to no cementitious value by themselves but which will, in finely divided form and in the presence of water, react chemically with certain chemicals present in the concrete composition to form compounds possessing cementitious properties. For example, pozzolans and burned organic matter residues (e.g. fly ash, silica fume from silicon smelting, highly reactive metakaolin, palm oil fuel ash, date palm ash, etc.), while not considered "cements", are considered to be "binders" in the present disclosure.

As used herein, a "concrete composition" refers to a workable mixture comprising water, aggregate (e.g., coarse and fine aggregate), and binder, which has not been cured/set/hardened, but which is capable of being cured/set/hardened to form useful building/structural materials such as concrete blocks. As used herein, a "cured concrete" refers to a cured/set/hardened form of the concrete composition which has formed into a hard matrix or stone-like material and is distinguished from the concrete composition in that it is no longer workable.

As used herein, "total aggregate" or "TA" refers to the total amount of coarse aggregate and fine aggregate employed in the concrete composition and cured concrete.

Concrete Compositions

In an effort to reduce $CO_2$ emissions, the cement industry has turned to replacing cement binders such as ordinary Portland cement with low cost burned agricultural waste products possessing binding properties. However, even when used as a partial cement replacement, such burned agricultural waste products often impart inadequate strength properties (e.g., compressive strength) to the concrete or mortar, once cured. Such inadequacies are exacerbated when attempting to completely replace cement with burned agricultural waste products.

Thus, the present disclosure provides a concrete composition (specifically an alkali-activated concrete, AAC) in which the only binder present is a treated palm oil fuel ash, and which sets into a high compressive strength cured concrete. The concrete composition generally comprises, consists essentially of, or consists of a treated palm oil fuel ash as binder, a coarse aggregate, a fine aggregate, an alkali activator of sodium hydroxide and sodium silicate, and water. The concrete composition may optionally contain one or more additives such as a strength enhancer, an accelerator, a retarder, a plasticizer (e.g., a superplasticizer), a pigment, a corrosion inhibitor, a bonding agent, and a reinforcing material.

Palm Oil Fuel Ash (POFA)

The oil palm is a tall-stemmed tree which belongs to the family Arecaceae (commonly known as palms). Oil palm trees, primarily the African oil palm *Elaeis guineensis*, and to a lesser extent the American oil palm *Elaeis* oleifera and the maripa palm *Attalea maripa*, are cultivated for their palm oil producing fruit. The countries in the equatorial belt that cultivate oil palm are Benin Republic, Colombia, Ecuador, Nigeria, Zaire, Malaysia, and Indonesia, of which Malaysia is the largest producer of palm oil and palm oil products (around 47-51% of the worlds exports of palm oil). In the palm oil industry, palm oil is extracted from the fruit and copra of the palm oil tree. After the extraction process, waste products such as palm oil fibers, shells, and empty fruit brunches are burned as biomass boiler fuel at 800 to 1,000° C. to boil water, which generates steam to power a turbine for supplying electrical energy to the entire palm oil mill extraction process. Usually, the palm oil waste product burned in the boiler is made up of about 85% palm oil fibers and about 15% shells and empty fruit bunches, although these percentages may of course vary. The resulting ashy, combustion byproduct is palm oil fuel ash (POFA), which constitutes about 5 wt. % of solid waste products formed during palm oil processing. POFA does not have sufficient nutrient value to be used as fertilizer and has traditionally been disposed in open fields (profitless).

The inventors have found that palm oil fuel ash, specifically palm oil fuel ash which is treated in a certain way, can be used as a full replacement binder for cement in concrete compositions without adversely affecting the compressive strength of the cured concrete, when used in combination with an alkali activator.

'Raw' palm oil fuel ash, that is, palm oil fuel ash as it is formed/received from the oil palm boiler, typically has too high a carbon content (caused by incomplete burning of the residue) for use as an acceptable binder. Raw POFA typically also has a high moisture content of from 3 to 19 wt. %, or 4 to 15 wt. %, or 5 to 10 wt. % water, based on a total weight of the POFA, and a relatively large particle size, for example a median particle size ($d_{50}$) of 55 to 75 μm, preferably 60 to 70 μm, preferably 64 to 66 μm.

In preferred embodiments, the palm oil fuel ash utilized herein is treated palm oil fuel ash, which is palm oil fuel ash which has been subjected to a combination of drying, sieving, ball milling, and calcining. Briefly, treated palm oil fuel ash may be formed according to the following procedure.

The raw palm oil fuel ash obtained from a palm oil production facility (e.g., palm oil mill, United Oil Palm Industries Sdn. Bhd. in Nibong Tebal, Penang, Malaysia) may first be dried, for example, in an oven at 80 to 120° C., preferably 90 to 110° C., preferably 95 to 105° C., preferably about 100° C., to reduce the moisture content to below 5 wt. %, preferably below 4 wt. %, preferably below 3 wt. %, preferably below 2 wt. %, preferably below 1 wt. %. The raw palm oil fuel ash may be dried for any amount of time that provides an adequately dried product, typically, for drying times of 12 to 48 hours, preferably 16 to 36 hours, preferably 20 to 30 hours, preferably 24 hours.

The resulting dried palm oil fuel ash may then be subjected to sieving through one or more sieves of different size, preferably two or more sieves of different size, for example, sequentially through sieves of decreasing size to remove coarser and unwanted particulates. In preferred embodiments, the dried palm oil fuel ash is sieved sequentially through sieves of decreasing size, preferably through a set of two sieves of decreasing size, to provide sieved POFA having a particle size of less than 400 μm, preferably less than 350 μm, preferably less than 300 μm. For example, the dried POFA may be sieved sequentially through a set of 600 μm and 300 μm sieves, to provide sieved POFA containing no particles above 300 μm. Alternately the POFA may be sieved immediately upon removal from the kiln or boiler without intermediate drying.

The resulting sieved palm oil fuel ash may then be subjected to a first mechanical ball milling procedure to reduce the particle size and/or to increase the surface area of the ash. Any type of ball milling apparatus known to ordinary skill in the art may be employed, including, but not limited to, a standard ball mill, a planetary mill, a vibration mill, an attritor—stirring ball mill, a pin mill, or a rolling mill. The vials and balls used for the ball milling may be individually selected from agate (cryptocrystalline silica), corundum ($Al_2O_3$), zirconium oxide ($ZrO_2$), stainless steel (Fe, Cr, Ni), tempered steel (Fe, Cr), and tungsten carbide (WC), preferably stainless steel (e.g., SS 316). In some embodiments, the balls employed in the ball milling operation have a size of from 6 to 32 mm, preferably 8 to 28 mm, preferably 10 to 24 mm, preferably 12 to 20 mm, preferably a variety of ball sizes are employed for the ball milling operation.

The following ball milling parameters may be utilized. The ball to powder ratio (BPR) or charge ratio represents the weight ratio of the milling balls to the POFA charge. Various BPRs may be employed, but typically a BPR may range from 1:1 to 10:1, preferably 2:1 to 9:1, preferably 3:1 to 8:1, preferably 4:1 to 7:1, preferably 5:1 to 6:1. The sieved palm oil fuel ash may be ball milled at a rotational speed of 100 to 600 rpm, preferably 120 to 500 rpm, preferably 140 to 400 rpm, preferably 160 to 300 rpm, preferably 180 to 200 rpm. The milling time may also influence the product morphology and particle size. Suitable milling times that may be practiced herein range from 15 minutes to 8 hours, preferably 30 minutes to 6 hours, preferably 1 to 5 hours, preferably 1.5 to 4.5 hours, preferably about 2 to 4 hours, although shorter or longer milling times may also be practiced. Further, the sieved palm oil fuel ash may be ball milled in various atmospheres, for example, in some embodiments, ball milling is performed in air (or a generally oxygen-containing atmosphere, e.g., which includes any atmosphere that contains at least 20%, preferably at least 40%, preferably at least 60%, preferably at least 80%, preferably at least 90%, preferably at least 95%, preferably at least 99%, or about 100% oxygen by volume). Alternatively, ball milling may be carried out under an inert atmosphere such as under nitrogen or argon, preferably argon. The resulting product may be referred to herein as ground palm oil fuel ash or "GPOFA". In general, the GPOFA has a median particle size ($d_{50}$) of 2.8 to 3.5 μm, preferably 2.9 to 3.1 μm, preferably 2.96 to 3.0 μm.

At this stage, GPOFA still contains a relatively high amount of unburned carbon, with a loss on ignition (LOI) of greater than 8 wt. %, or greater than 9 wt. %, or greater than 10 wt. %, and a correspondingly low amount of constituent oxides useful for enhancing binding properties (see Table 1 for an example chemical constitution of GPOFA). To remove the unburned carbon content and to provide an ash material with improved pozzolanic properties, the GPOFA is preferably calcined. The calcination may be performed in a furnace, for example, a gas-powered furnace. The calcination may be performed using a pre-set temperature program or using other variable temperature systems known by those of ordinary skill in the art. The GPOFA may be calcined under isothermal conditions or under variable temperature conditions, typically at a temperature range of 400 to 900° C., preferably 425 to 850° C., preferably 450 to 800° C., more preferably 475 to 750° C., preferably 500 to 700° C., preferably 550 to 600° C. The calcination is typically performed for 20 minutes to 8 hours, preferably 40 minutes to 6 hours, preferably 60 minutes to 4 hours, preferably 80 minutes to 3 hours, preferably 90 minutes to 2 hours, although shorter or longer calcination times may also be used herein.

While the calcined palm oil fuel ash may possess adequate binding capabilities when employed as a partial cement replacement, or in a blend (binary, ternary, etc.) with other binding materials (e.g., fly ash, ground blast furnace slag, silica fume, metakaolin, etc.), it has been discovered that subjecting the calcined palm oil fuel ash to a second mechanical ball billing procedure provides a palm oil fuel ash product with the highest performance (referred to herein as treated palm oil fuel ash or "TPOFA"), which enables its use as a full cement replacement, and without the need for additional binders. The parameters of the second ball milling procedure are as described for the first ball milling procedure above. The parameters used (the type of equipment, the materials used for the vials, the materials used for the balls, the ball size, the BPR, the rotational speed, the milling time, the milling atmosphere) for the first ball milling and the second ball milling may be the same, or different, preferably the parameters used for the first and second ball milling operations are the same.

Treated palm oil fuel ash (TPOFA) may vary in terms of the percent of constituent oxides present depending on a number of factors, such as the type of oil palm tree cultivated, the source/location of the oil palm tree cultivated, the relative proportion of the waste products (palm oil fibers, shells, and empty fruit brunches) combusted to produce the POFA, the combustion conditions, as well as the post-combustion processing, etc. The treated palm oil fuel ash used herein generally comprises, consists of, or consists essentially of, $SiO_2$, $Al_2O_3$, $Fe_2O_3$, CaO, MgO, $K_2O$, $SO_3$, $Na_2O$, and $P_2O_3$. In preferred embodiments, the treated palm oil fuel ash utilized in the present disclosure has a total content of $SiO_2$, $Al_2O_3$, and $Fe_2O_3$ that complies with ASTM C618 class F standards for pozzolan, which is incorporated herein by reference in its entirety. The present disclosure contemplates using a wide variety of treated palm oil fuel ash materials, with the following constitutional makeup being preferred.

In some embodiments, the treated palm oil fuel ash has a weight percentage of $SiO_2$ of 60 to 72 wt. %, preferably 61 to 71 wt. %, preferably 62 to 70 wt. %, preferably 63 to 69 wt. %, preferably 64 to 68 wt. %, preferably 65 to 67.5 wt. %, preferably 66 to 67 wt. %, based on a total weight of the treated palm oil fuel ash.

In some embodiments, the treated palm oil fuel ash has a weight percentage of $Al_2O_3$ of 4 to 8 wt. %, preferably 4.5 to 7.5 wt. %, preferably 5 to 7 wt. %, preferably 5.5 to 6.8 wt. %, preferably 6 to 6.5 wt. %, based on a total weight of the treated palm oil fuel ash.

In some embodiments, the treated palm oil fuel ash has a weight percentage of $Fe_2O_3$ of 3 to 7 wt. %, preferably 3.5 to 6.5 wt. %, preferably 4 to 6.3 wt. %, preferably 4.5 to 6.1 wt. %, preferably 5 to 6 wt. %, preferably 5.5 to 5.8 wt. %, based on a total weight of the treated palm oil fuel ash.

In some embodiments, the treated palm oil fuel ash has a weight percentage of CaO of 3 to 8 wt. %, 3.5 to 7 wt. %, preferably 4 to 6.5 wt. %, preferably 4.5 to 6.3 wt. %, preferably 5 to 6.1 wt. %, preferably 5.3 to 6 wt. %, preferably 5.5 to 5.8 wt. %, based on a total weight of the treated palm oil fuel ash.

In some embodiments, the treated palm oil fuel ash has a weight percentage of MgO of 1 to 5 wt. %, preferably 1.5 to 4.5 wt. %, preferably 2 to 4 wt. %, preferably 2.5 to 3.8 wt. %, preferably 3 to 3.5 wt. %, preferably 3.1 to 3.2 wt. %, based on a total weight of the treated palm oil fuel ash.

In some embodiments, the treated palm oil fuel ash has a weight percentage of $K_2O$ of 3 to 7 wt. %, preferably 3.5 to 6.5 wt. %, preferably 4 to 6 wt. %, preferably 4.5 to 5.8 wt. %, preferably 5 to 5.4 wt. %, preferably 5.1 to 5.3 wt. %, based on a total weight of the treated palm oil fuel ash.

In some embodiments, the treated palm oil fuel ash has a weight percentage of $SO_3$ of 0.2 to 0.5 wt. %, preferably 0.25 to 0.45 wt. %, preferably 0.3 to 0.4 wt. %, preferably 0.31 to 0.38 wt. %, preferably 0.32 to 0.34 wt. %, based on a total weight of the treated palm oil fuel ash.

In some embodiments, the treated palm oil fuel ash has a weight percentage of $Na_2O$ of 0.1 to 0.25 wt. %, preferably 0.13 to 0.23 wt. %, preferably 0.15 to 0.22 wt. %, preferably 0.17 to 0.21 wt. %, preferably 0.18 to 0.2 wt. %, based on a total weight of the treated palm oil fuel ash.

In some embodiments, the treated palm oil fuel ash has a weight percentage of $P_2O_3$ of 1 to 5 wt. %, preferably 2 to 4 wt. %, preferably 3 to 3.8 wt. %, preferably 3.2 to 3.6 wt. %, preferably 3.3 to 3.5 wt. %, based on a total weight of the treated palm oil fuel ash.

In some embodiments, the treated palm oil fuel ash of the present disclosure has a loss on ignition (LOI) of less than 4 wt. %, preferably less than 3 wt. %, preferably less than 2.5 wt. %, preferably less than 2.4 wt. %, preferably less than or equal to 2.3 wt. %, based on a total weight of the treated palm oil fuel ash.

In preferred embodiments, the treated palm oil fuel ash comprises, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, 0.18 to 0.2 wt. % $Na_2O$, and 3 to 4 wt. % of $P_2O_3$, each based on a total weight of the treated palm oil fuel ash.

In some embodiments, the treated palm oil fuel ash has a median particle size ($d_{50}$) of 0.5 to 2.0 µm, preferably 0.6 to 1.8 µm, preferably 0.7 to 1.6 µm, preferably 0.8 to 1.4 µm, preferably 0.9 to 1.2 µm, preferably 1.0 to 1.1 µm, preferably 1.068 µm.

In some embodiments, the treated palm oil fuel ash has a specific surface area of 1.4 to 1.6 $m^2/g$, preferably 1.45 to 1.58 $m^2/g$, preferably 1.5 to 1.56 $m^2/g$, preferably 1.51 to 1.54 $m^2/g$, preferably 1.52 to 1.53 $m^2/g$.

The treated palm oil fuel ash may be used as a partial replacement of cement or may be used in combination with one or more other binders (discussed below) in a binder blend. Therefore, in such circumstances, the treated palm oil fuel ash may be employed in an amount of up to 30 wt. %, preferably up to 25 wt. %, preferably up to 20 wt. %, preferably up to 15 wt. %, preferably up to 10 wt. %, preferably up to 5 wt. %, preferably up to 1 wt. %, preferably up to 0.5 wt. %, based on a total weight of the concrete composition. However, the treated palm oil fuel ash may be advantageously employed as a complete cement replacement, and wherein the TPOFA is the only binder present. Thus, in preferred embodiments, the treated palm oil fuel ash is the only binder present, and is employed an amount of 20 to 30 wt. %, preferably 21 to 29 wt. %, preferably 22 to 28 wt. %, preferably 23 to 27 wt. %, preferably 24 to 26 wt. %, preferably 25 wt. %, based on a total weight of the concrete composition.

In the present disclosure, other binders which may be optionally included in the concrete composition, but which are preferably excluded from the concrete composition, include any cement and/or pozzolan/burned organic matter residues (other than TPOFA) capable of producing cement-like binding properties.

Exemplary cements may be any hydraulic cement or a non-hydraulic cement, for example, Ordinary Portland Cement (OPC) type I, type II, type III, type IV, type V, type Ia, type IIa, type IIIa or a combination thereof (in accordance with the ASTM CI50 standard); Portland fly ash cement; Portland Pozzolan cement; Portland silica fume cement; masonry cements; EMC cements; stuccos; plastic cements; expansive cements; white blended cements; Pozzolan-lime cements; slag cements; slag-lime cements; supersulfated cements; calcium aluminate cements; calcium sulfoaluminate cements; geopolymer cements; Rosendale cements; polymer cement mortar; lime mortar; Pozzolana mortar; and the like, as well as mixtures thereof.

Exemplary pozzolanic and/or burned organic matter residues may include, but are not limited to, limestone; fly ash (e.g. siliceous fly ash and/or calcareous fly ash), for example Class C fly ash, Class F fly ash, pulverized fly ash, ultrafine Class F fly ash; slag; ground blast furnace slag (GGBFS or GGBS); cement kiln dust (CKD); silica fume or other fine forms of silica such as fine silica flour; metakaolin; vitreous calcium aluminosilicate (VCAS); carbon nanofibers and other carbon products; calcium hydroxide ($Ca(OH)_2$); date palm ash or simply "palm ash", which is produced as wastage during the production of palm firewood and coal products (typically has a chemical constitution of 30-40 wt. % $SiO_2$, 0.1-1.0 wt. % of $Fe_2O_3$, 10-15 wt. % of CaO, 0.1-1.0 wt. % of $Al_2O_3$, 5-10 wt. % of MgO, 2-10 wt. % of $K_2O$, and 1-5 wt. % of $Na_2O$); burned palm oil products (other than palm oil fuel ash) such as oil palm shell (OPS); rice husk ash; volcanic ashes and pumices (e.g., crushed volcanic glass); diatomaceous earth; synthetic pozzolans such as synthesized reactive aluminosilicate glasses; zeolite materials such as calcined zeolites; cenospheres; pozzolana; calcined shale; trass; pumice; siliceous clays; metropolitan waste ash; sewerage ash; coal wash tailings; mineral tailings; scoria; obsidian; other flue ashes; and other ash derived from burning organic waste.

Aggregate

The concrete composition of the present disclosure includes one or more coarse aggregates. Coarse aggregates are used to influence the concrete's freshly mixed and hardened properties, mixture proportions, and economy of producing. The types and amounts of coarse aggregate can be varied depending on the application. For example, the type and amount of coarse aggregate can be varied to produce a lightweight concrete with a bulk density commonly less than about 1450 $kg/m^3$, a normal weight concrete with a bulk density of about 1500 to 2400 $kg/m^3$ (ASTM C33), or a heavyweight concrete with a bulk density of greater than 2400 $kg/m^3$ (ASTM C637 and C638).

Exemplary coarse aggregates include, but are not limited to, crushed recycled concrete, crushed stone, gravel, rocks, natural soil, quarried crushed mineral aggregates from igneous (granite, syenite, diorite, gabbro peridotite pegmatite, volcanic glass, felsite, basalt), metamorphic (marble, metaquartzite, slate, phyllite, schist, amphibolite, hornfels, gneiss, serpentite) or sedimentary rocks (conglomerate, sandstone, claystone, siltstone, argillite, shale, limestone, dolomite, marl, chalk, chert), including unused and waste aggregates from quarry operations, dredged aggregates, china clay stent, china clay wastes, natural stone, recycled bituminous pavements, recycled concrete pavements, reclaimed road base and subbase materials, crushed bricks, construction and demolition wastes, waste/recycled flue gas ashes, crushed glass, slate waste, waste plastics, egg shells, sea shells, barite, limonite, magnetite, ilmenite, hematite, iron, steel, including recycled or scrap steel, and mixtures thereof. In preferred embodiments, the coarse aggregate is crushed stone.

The amount of coarse aggregate deployed herein may vary, but typical values range between but typical values range between 12 to 33 wt. %, preferably 14 to 31 wt. %, preferably 16 to 30 wt. %, preferably 18 to 29 wt. %, preferably 20 to 28 wt. %, preferably 22 to 27 wt. %, preferably 24 to 26 wt. %, based on a total weight of the concrete composition.

Typically, the coarse aggregate has particle size of 2 to 20 mm, preferably 2.1 to 18 mm, preferably 2.3 to 16 mm, preferably 2.5 to 14 mm, preferably 3 to 12 mm, preferably 4 to 10 mm, preferably 5 to 8 mm, although coarse aggregates with particle sizes above or slightly below these values may also function as intended. The grading of coarse aggregate employed herein preferably conforms to the standard ASTM C33/C33M-18, which is incorporated herein by reference in its entirety.

In preferred embodiments, the coarse aggregate utilized in the concrete composition has a bimodal particle size distribution, preferably a bimodal particle size distribution with a first mode particle size of 4 to 12.5 mm, preferably 4.25 to 10 mm, preferably 4.5 to 8 mm, preferably 4.75 to 6 mm, and second mode particle size of 2 to less than 4 mm, preferably 2.1 to 3.5 mm, preferably 2.2 to 3 mm, preferably 2.3 to 2.8 mm, preferably 2.36 to 2.6 mm. In some embodiments, the first mode particle size is the predominant particle size. In some embodiments, a weight ratio of the first mode particle size to the second mode particle size is from 1:1 to 5:1, preferably 1.2:1 to 4.5:1, preferably 1.4:1 to 4:1, preferably 1.6:1 to 3.5:1, preferably 1.8:1 to 3:1, preferably 2:1 to 2.5:1.

In preferred embodiments, the coarse aggregate has a saturated surface dry (SSD) specific gravity of 2.4 to 2.7, preferably 2.45 to 2.65, preferably 2.5 to 2.6, preferably 2.55 to 2.56. Saturated surface dry (SSD) is defined as the condition of an aggregate in which the surfaces of the particles are "dry" (i.e., surface adsorption would no longer take place), but the inter-particle voids are saturated with water. In this condition aggregates will not affect the free water content of a composite material. That is, SSD specific gravity is the ratio of the weight in air of a unit volume of aggregate, including the weight of water within the voids filled to the extent achieved by submerging in water for approximately 15 hours, and where the excess, free surface moisture has been removed so that he surface of the particle is essentially dry, to the weight in air of an equal volume of gas-free distilled water at the stated temperature, for example, according to AASHTO T 84.

The concrete composition of the present disclosure also includes one or more fine aggregates. The fine aggregate may include, but is not limited to, sand (e.g., dune sand), or any of the materials listed for coarse aggregate which have been ground/pulverized into fine particles. In the event a coarse aggregate and a fine aggregate are used in the concrete composition that is sourced from the same material, for example, crushed limestone, then the particle size will dictate whether it is defined as coarse or fine aggregate. In preferred embodiments, the fine aggregate employed herein is dune sand. The fine aggregate may have an average particle size of 0.3 to less than 2 mm, preferably 0.35 to 1.5 mm, preferably 0.4 to 1.0 mm, preferably 0.45 to 0.9 mm, preferably 0.5 to 0.8 mm, preferably 0.6 to 0.7 mm, although fine aggregates with average particle sizes slightly above or below these values may also function as intended. The grading of fine aggregate employed herein preferably conforms to the standard ASTM C 33/C33M-18, which is incorporated herein by reference in its entirety.

The amount of fine aggregate deployed herein may vary, but typical values range between but typical values range between 8 to 30 wt. %, preferably 9 to 27 wt. %, preferably 10 to 25 wt. %, preferably 11 to 23 wt. %, preferably 12 to 20 wt. %, preferably 13 to 18 wt. %, preferably 14 to 16 wt. %, based on a total weight of the concrete composition.

In preferred embodiments, the fine aggregate has a fineness modulus of 1.8 to 2.1, preferably 1.81 to 2.0, preferably 1.82 to 1.9, preferably 1.83 to 1.88, preferably 1.84 to 1.86, preferably 1.85. The Fineness modulus (FM) is an empirically determined index of the fineness of an aggregate—the higher the FM, the coarser the aggregate. The fineness modulus is obtained by adding the cumulative percentages by mass retained on each of a specified series of sieves and dividing the sum by 100. The specified sieves for determining the fineness modulus for fine aggregate are 0.15 mm, 0.3 mm, 0.6 mm, 1.18 mm, 2.36 mm, 4.75 mm, and 9.5 mm, for example, according to ASTM C125 and ASTM C33/C33M-18.

In preferred embodiments, the fine aggregate has a saturated surface dry (SSD) specific gravity of 2.5 to 2.7, preferably 2.55 to 2.68, preferably 2.6 to 2.66, preferably 2.61 to 2.64, preferably 2.62.

In some embodiments, a weight ratio of the coarse aggregate to the fine aggregate is 1:1 to 2:1, preferably 1.1:1 to 1.5:1, preferably 1.2:1 to 1.3:1. That is, preferably, the coarse aggregate accounts for 50 to 66 wt. % of the total aggregate (coarse plus fine aggregate), preferably 52 to 60 wt. %, preferably 54 to 56 wt. %, preferably 55 wt. %.

The amount of total aggregate (TA) utilized herein may vary, but typically a weight ratio of the total aggregate (coarse plus fine aggregate) to the treated palm oil fuel ash ranges from 1:1 to 2:1, preferably 1.2:1 to 1.95:1, preferably 1.4:1 to 1.9:1, preferably 1.6:1 to 1.85:1, preferably 1.7:1 to 1.8:1. In some embodiments, the total aggregate has a fineness modulus of 3.0 to 4.2, preferably 3.2 to 4.1, preferably 3.3 to 4.0, preferably 3.4 to 3.9, preferably 3.5 to 3.8, preferably 3.6 to 3.7.

Alkali Activator

An alkali activator must be included in the concrete composition. Alkali activation generally releases reactive species (e.g., CaO) from the binder, thus increasing the rate of densification and improving the microstructural strength of the binder, which by extension affects the mechanical properties and durability performance of the cured concrete. The alkali activator may be a mixture of an aqueous solution of a metal hydroxide, preferably an alkali metal hydroxide (e.g., sodium hydroxide, potassium hydroxide, etc.), and a metal silicate, preferably an alkali metal silicate (e.g., sodium silicate, potassium silicate, etc.). In some embodiments, the alkali activator may be an aqueous solution of a metal hydroxide, preferably an alkali metal hydroxide.

In preferred embodiments, the alkali activator is an aqueous mixture of sodium hydroxide and sodium silicate. Preferably, the alkali activator consists of sodium hydroxide and sodium silicate in water. A weight ratio of sodium silicate to sodium hydroxide may generally range from 1:1 to 3:1, preferably 1.2:1 to 2.9:1, preferably 1.4:1 to 2.8:1, preferably 1.6:1 to 2.7:1, preferably 1.8:1 to 2.6:1, preferably 2:1 to 2.5:1. In some embodiments, the sodium silicate has a silica modulus ($SiO_2$:$Na_2O$ weight ratio) of 1.5 to 4, preferably 2 to 3.8, preferably 2.5 to 3.6, preferably 3 to 3.4, preferably 3.3. In some embodiments, the sodium hydroxide has a specific gravity of 2 to 2.4, preferably 2.05 to 2.3, preferably 2.1 to 2.2, preferably 2.13.

In preferred embodiments, the concrete compositions are prepared using a weight ratio of the alkali activator to the treated palm oil fuel ash of from 0.3:1 to 0.7:1, preferably 0.34:1 to 0.65:1, preferably 0.36:1 to 0.6:1, preferably 0.38:1 to 0.55:1, preferably 0.4:1 to 0.5:1.

The way in which the alkali activator is prepared may also impact the final properties of the cured concrete. For example, the concentration of the sodium hydroxide used to prepare the alkali activator has been found to impact the compressive strength of the cured concrete. Typically, the sodium hydroxide and sodium silicate are premixed in the form of an aqueous solution, and this aqueous alkali activator solution is then added to any dry components to form the concrete composition, as will be discussed hereinafter. In this process, it has been found that use of an aqueous solution of sodium hydroxide having a concentration of 8 to 14 mol/L, preferably 9 to 13 mol/L, preferably 10 to 12 mol/L, preferably 10 mol/L ultimately provides cured concretes with superior compressive strength properties. Without being bound by theory, it is believed that such molar concentrations of sodium hydroxide combines with the sodium silicate in such a way that effects the rate of silica and alumina release from the palm oil fuel ash material, and the enhanced dissolution produces cured concrete with superior strength characteristics (e.g., compressive strength).

Water

The cement composition also includes water. In some embodiments, the weight ratio of the water to the treated palm oil fuel ash is 0.06 to 0.98, preferably 0.1 to 0.9, preferably 0.2 to 0.8, preferably 0.3 to 0.7, preferably 0.4 to 0.6, preferably 0.5 to 0.55. In preferred embodiments, the concrete composition contains 2 to 15 wt. %, preferably 3 to 14 wt. %, preferably 4 to 13 wt. %, preferably 5 to 12 wt. %, preferably 6 to 11 wt. %, preferably 7 to 10 wt. %, preferably 8 to 9 wt. % water, based on a total weight of the concrete composition. However, such ratios and percentages are exemplary of typical values, and a person of ordinary skill can adjust the water content of the concrete compositions as needed to suit the application or workability requirements, and the water to binder (POFA) weight ratio or water weight percentages may therefore fall outside of these described ranges. Suitable water sources include fresh water, potable water, and the like, preferably potable water.

Additives

In some embodiments, the concrete compositions optionally include one or more additives such as a strength enhancer, an accelerator, a retarder, a plasticizer (e.g., a superplasticizer), a pigment, a corrosion inhibitor, a bonding agent, and a reinforcing material including mixtures thereof. The additional additive(s), when present, may be present in an amount up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on the total weight of the concrete composition.

The concrete composition of the present disclosure may optionally include a strength enhancer, preferably an aluminum-containing strength enhancer. Exemplary strength enhancers include, but are not limited to, aluminum hydroxide ($Al(OH)_3$), sodium fluoride, potassium fluoride, sodium sulfate, sodium oxalate, an alkali phosphate (e.g., sodium phosphate) and related compounds, just to name a few. In some embodiments, when employed, a weight ratio of the strength enhancer to the treated palm oil fuel ash is 0.01:1 to 0.05:1, preferably 0.015:1 to 0.04:1, preferably 0.016:1 to 0.03:1, preferably 0.018:1 to 0.025:1, preferably 0.02:1.

An accelerator is any chemical capable of accelerating the hardening (early strength development) of concrete. Suitable examples of accelerators that may be included in the concrete compositions herein include, but are not limited to, calcium nitrite, calcium nitrate, calcium formate, calcium chloride, sodium nitrate, or a combination thereof.

A retarder is any chemical capable of retarding the hardening (early strength development) of concrete. Acceptable examples of retarders include, but are not limited to, a borate salt such as of sodium pentaborate ($Na_2B_{10}O_{16}$), sodium tetraborate ($Na_2B_4O_7$) and boric acid ($H_3BO_3$); an organophosphonate such as sodium or calcium salts of ethylenediaminetetra (methylenephosphonic acid) (EDTMP), hexamethylenediaminetetra (methylenephosphonic acid), and diethylenetriaminepenta (methylenephosphonic acid); acrylamide copolymers such as copolymers formed from 2-acrylamido-2-methylpropane-3-sulphonic acid (AMPS) and one or more acrylic acid or non-sulfonated acrylamide monomers; metal sulfates such as ferrous sulfate; gypsum; sugar; sucrose; sodium gluconate; glucose; citric acid; tartaric acid; and the like; as well as mixtures thereof.

Broadly, a plasticizer is a material that when added to another yields a mixture which is easier to handle or has greater utility. The plasticizer as used herein means an organic compound which is usually non-volatile at standard room temperature and pressure (25° C., 1 atm.) and which has no specific chemical reactivity. As such, the plasticizer is generally inert towards the binder and merely serves as a medium in which that binder may be suspended or otherwise dispersed. Suitable plasticizers may include, but are not limited to, polyalkyleneglycols and other polyethers such as polyethylene glycol, polypropylene glycol, and polybutyleneglycol, including blends of two or more of such polyalkyleneglycols or blends of one or more of such polyalkyleneglycols with one or more co-plasticizers, as well as phosphonic acid terminated polyalkylene glycols; sulfonated or phosphorylated organic compounds such as alkyl sulfonic acid esters of phenol and cresol (for example MESAMOLL from Lanxess) and aromatic sulfonamides; alkyl or aryl esters of organic acids such as benzoic acid esters of glycols and their oligomers, esters of 1,2-dicarboxycyclohexane (hydrogenated phthalates), phthalic acid esters, terephthalic acid esters, trimellitates, adipic acid esters, sebasic acid esters, tartrate esters, citric acid esters and sucrose esters; oils which can be natural or synthetic, such as vegetable oils and their derivatives including fatty acid esters and epoxidized vegetable oils, organic liquids derived from wood and other forest products like liquid rosin esters, hydrocarbon fluids such as mineral oil or paraffinic liquids, and silicones; vinyl polymers such as polyisobutene, liquid polybutadiene, and polycarboxylates such as polycarboxylate ethers (PCE) made from polymers of acrylic acid and/or maleic acid with ether side chains, for example ETHACRYL products from Arkema or MASTERGLENIUM products from BASF; polyesters; formaldehyde (formalin) resins (condensates) such as sulfonated naphthalene formaldehyde resin, sulfonated melamine formaldehyde resin, acetone formaldehyde resin, e.g., crosslinked PMS (polymelamine sulfonate) and crosslinked PNS (polynaphthalene sulfonate); and mixtures thereof.

One particular type of plasticizer known as a superplasticizer (SP) may be optionally employed in the disclosed concrete compositions. Superplasticizers are also known as high range water reducers, and are additives generally used in making high strength mortar or concrete. In preferred embodiments, when present, the superplasticizer satisfies the ASTM C494/C494M-17 requirements, which is incorporated herein by reference in its entirety. The superplasticizers that may be employed in the present disclosure include, but are not limited to, polyalkylaryl sulfonate superplasticizers, such as condensation products of naphthalene sulfonic acid with formalin or a salt thereof, a condensation product of methylnaphthalene sulfonic acid with formalin or a salt thereof, and a condensation product of anthracene sulfonic acid with formalin or a salt thereof, for example, MIGHTY 100, MIGHTY 150, and MIGHTY 200 each available from KAO Corporation, and PANTARHIT FT-500 available from Ha—Be Betonchemie; melamine/formalin resin sulfonate superplasticizers, for example MELMENT F-10 available from BASF; sulfonated copolymer superplasticizers such as styrene-α-methylstyrene copolymers containing a mole ratio of from 90:10 to 10:90, preferably 30:70 to 70:30, of styrene to α-methylstyrene; polycarboxylates, in particular polycarboxylate ethers such as those made from copolymerization of (meth)acrylic acids, maleic anhydride, maleic acids or their salts, with polyoxyethylene (meth)acrylic esters or adducts of polyethylene derivatives to vinyl monomers, for example MELFLUX or MASTERGLENIUM products available from BASF; or any other plasticizers exhibiting strong tackiness and non-bleeding properties; including mixtures thereof. In some embodiments, when present, the superplasticizer is a chloride-free superplasticizer. In preferred embodiments, when present, the superplasticizer is a sulfonated naphthalene formalin resin.

Pigments may be optionally included in the concrete composition to eventually form colored cured concretes. Exemplary pigments include, but are not limited to, iron oxide, natural burnt umber, carbon black, chromium oxide, ultra-marine blue, titanium dioxide, among many other pigments known to those of ordinary skill in the art to provide concretes with desirable colors.

The concrete compositions may optionally be formulated with corrosion inhibitors. Any corrosion inhibitor known to those of ordinary skill in the art for use in mortar/concrete applications may be used herein, with specific mention being made to nitrites (e.g. calcium nitrite), chromates, phosphates, benzotriazoles, alkanolamines (e.g. N,N-diethyl-ethanolamine, N-methyl-ethanolamine, monoethanloamine, diethanloamine, triethanloamine), including mixtures thereof.

Bonding agents may also be optionally included in the concrete compositions. Exemplary bonding agents include, but are not limited to, aluminum sulfate, latex resins such as acrylic polymer latex resins, epoxy resins, vinyl polymer resins, and mixtures thereof.

The concrete composition may also optionally be formulated to include at least one reinforcing material. The reinforcing materials may provide increased strength and impact resistance by increasing the flexural and tensile strength of the cured concrete formed from the concrete composition and thus increasing the amount of energy required to cause rupture and complete failure. Exemplary reinforcing materials include, but are not limited to, steel rebar, wire mesh, steel fibers, and synthetic polymer fibers such as polypropylene fibers, nylon fibers, and polyvinyl alcohol (PVA) fibers.

In some embodiments, the concrete composition is substantially free of additives. In some embodiments, the concrete composition is substantially free of strength enhancers (e.g., aluminum hydroxide). In some embodiments, the concrete composition is substantially free of plasticizers, in particular, superplasticizers. In some embodiments, the concrete composition is substantially free of organosilicon compounds. In some embodiments, the concrete compositions are substantially free of synthetic polymers such as polyvinyl alcohol (PVA), including PVA fibers, either coated or uncoated. In some embodiments, the concrete composition is substantially free of foaming agents. In some embodiments, the concrete composition is substantially free of defoamers. In preferred embodiments, the concrete composition consists of the treated palm oil fuel ash, the coarse aggregate, the fine aggregate, sodium hydroxide, sodium silicate, and water.

In some embodiments, the concrete composition has a workable flow, expressed as a percentage increase in the average base diameter of a 50 mm cube concrete specimen after performing table drops compared to the original base diameter, of 105 to 140%, preferably 110 to 135%, preferably 115 to 130%, preferably 120 to 125%, per ASTM C1437, which is incorporated herein by reference in its entirety.

Any method known by those of ordinary skill in the art may be used to make the concrete composition of the present disclosure. One exemplary method will now be briefly described.

The concrete compositions of the present disclosure may be prepared by first dry-mixing the binder (e.g. treated palm oil fuel ash), the fine aggregate, and any solid optional additives either by hand or using a mechanical mixer such as a Hobart planetary bench mixer for any time period suitable for removing air pockets and forming a uniform mixture of dry materials (dry mix). Typical mixing times may be around 0.5 to 10 minutes, preferably 1 to 5 minutes, preferably 2 to 3 minutes. In some embodiments, such a dry mix may be obtained as a pre-formed and/or pre-packaged dry mix. The coarse aggregate may be added along with the other components that make up the dry mix or may be combined with an already formed dry mix, and evenly distributed throughout.

Next, the alkali activator (e.g., an aqueous mixture of sodium hydroxide and sodium silicate) may be added and the mixture may be mixed for 1 to 10 minutes, preferably 3 to 8 minutes, preferably 5 to 6 minutes, although time periods outside of these ranges may also be acceptable.

In some embodiments, all of the water used to make the concrete composition comes from the addition of the alkali activator. Alternatively, in some instances it may be desirable to add additional water and/or any optional additive(s) (e.g., superplasticizer) after alkali activation to improve the consistency/workable flow of the concrete composition or to otherwise change the properties of the concrete composition/ cured concrete. When additional water and/or optional additive(s) are added, the mixture may be preferably mixed for an additional 1 to 10 minutes, preferably 3 to 8 minutes, preferably 4 to 5 minutes, or otherwise to provide an overall average mixing time of 8 to 16 minutes, preferably 10 to 14 minutes, preferably 12 minutes. Intermittently, the mixing operation may be stopped to remove any clumps of solid materials that stick to the bottom of the mixing vessel, and then mixing may be again continued until a desirable homogeneity and consistency of the concrete composition has been achieved.

Of course, the relative amounts of the components may be adjusted at any point to achieve concrete compositions having the desired properties. For example, the workable flow may be tested according to ASTM C1437 and the relative amounts of any component(s) (e.g., water, coarse aggregate, fine aggregate, binder, and/or any optional additive(s)) may be adjusted as needed to be within desired specifications.

Cured Concrete

After forming the concrete composition, the concrete composition may be molded (and demolded), casted, placed, applied, compacted, and/or finished, and cured (set) as needed to suit a particular application. For example, the concrete composition may be fed into a mold, demolded and cured, to create any desired shape, for example the shape of a masonry block for application in construction materials. The concrete composition may be cast in a mold off-site and cured to produce a precast or the concrete compositions may be cast in a mold or into a site-specific form on-site and cured. The concrete composition may be molded, casted, placed, applied, and then optionally vibrated in a filled mold or site-specific form to remove air and/or minimize segregation. In some embodiments, a top surface of the filled mold is removed and fresh mixture is added to fill the mold. Such vibration and/or filling steps may be repeated as necessary to produce the desired composition or product. Any molding, casting, placing, applying, compacting, finishing, and/or curing steps may be carried out in a controlled environment off-site, for example when forming a precast, or performed on site in standard concrete processes.

Curing may be carried out under ambient conditions, for example 20 to 35° C., preferably 23 to 30° C., preferably 25 to 28° C., or through applied heat, for example at temperatures of 50 to 70° C., preferably 55 to 65° C., preferably 60° C. The cure times may vary from 1 day to 180 days, for example, 1, 3, 7, 14, 28, 90, 180 days and any time in between those stated values, preferably 7 to 28 days.

In some embodiments, the cured concrete has a unit weight of 2200 to 2300 kg/m$^3$, preferably 2210 to 2290 kg/m$^3$, preferably 2220 to 2280 kg/m$^3$, preferably 2230 to 2270 kg/m$^3$, preferably 2240 to 2260 kg/m$^3$, preferably 2250 kg/m$^3$.

The concrete composition described herein provides cured concrete with high compressive strength especially considering that cement is preferably fully replaced with a waste product (i.e., treated palm oil fuel ash). The concrete composition provides, after curing/setting, a cured concrete with a 28-day compressive strength of 33 to 49 MPa, preferably 34 to 48.5 MPa, preferably 35 to 48 MPa, preferably 36 to 47.5 MPa, preferably 37 to 47 MPa, preferably 38 to 46.5 MPa, preferably 39 to 46 MPa, preferably 40 to 45.5 MPa, preferably 41 to 45 MPa. All compressive strength tests may be tested using 50 mm concrete samples according to ASTM C39, which is incorporated herein by reference in its entirety.

The disclosed concrete compositions may be useful in many structural and infrastructural applications that utilize concrete, brick, or other structural element as building material, and in the manufacture of various end use articles or products. In some embodiments, various cured concrete products are formed from setting/curing the disclosed concrete compositions. The disclosed cured concrete products may be in the form of a useful shape, formed by a variety of means such as, for example, using molds, casts, or forms, or the like, in accord with their intended use. Any typical process of forming concrete can be used herein. Therefore, the cured concrete may refer to a molded article or building material. For example, the cured concrete may be applied to or otherwise used to form, slabs, panels, precast panels, wall boards, hollow blocks, floor and roof tiles, catch basins, manholes, beams, columns, posts, conduits and pipes, gravestones, insulators, external cladding, slate, concrete decking, e.g. swimming pools, surfaces and surrounds, ceramic style products, marble like products, sink tops, bar tops, bathroom tops, table tops, fireplace tiles, fire proof walls, building blocks (e.g. masonry blocks); both reinforced and not reinforced by steel, depending on the use and purpose for which the manufactured products are fabricated. In some embodiments, the cured concrete described herein possess sufficient mechanical properties for use in applications described in ASTM C139, which is incorporated herein by reference in its entirety.

The cured concrete may be optionally reinforced as needed depending on the application. There are various ways of making reinforced concrete. Reinforced concrete can be made by forming the concrete inside a metal or timber framework or by casting the concrete composition around ridged steel bars, or rebars (reinforcing bars) and then cured. Another variation called stressed or pre-stressed concrete involves molding the concrete composition (wet) around pre-tensioned steel wires. The wires compress the concrete as it sets, making it much harder.

Having generally described this disclosure, a further understanding can be obtained by reference to certain specific examples which are provided herein for purposes of illustration only and are not intended to be limiting unless otherwise specified.

Where a numerical limit or range is stated herein, the endpoints are included. Also, all values and subranges within a numerical limit or range are specifically included as if explicitly written out.

The present disclosure also contemplates other embodiments "comprising", "consisting of" and "consisting essentially of", the embodiments or elements presented herein, whether explicitly set forth or not.

As used herein, the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Materials and Methods
Palm Oil Fuel Ash (POFA)

Figure 4:
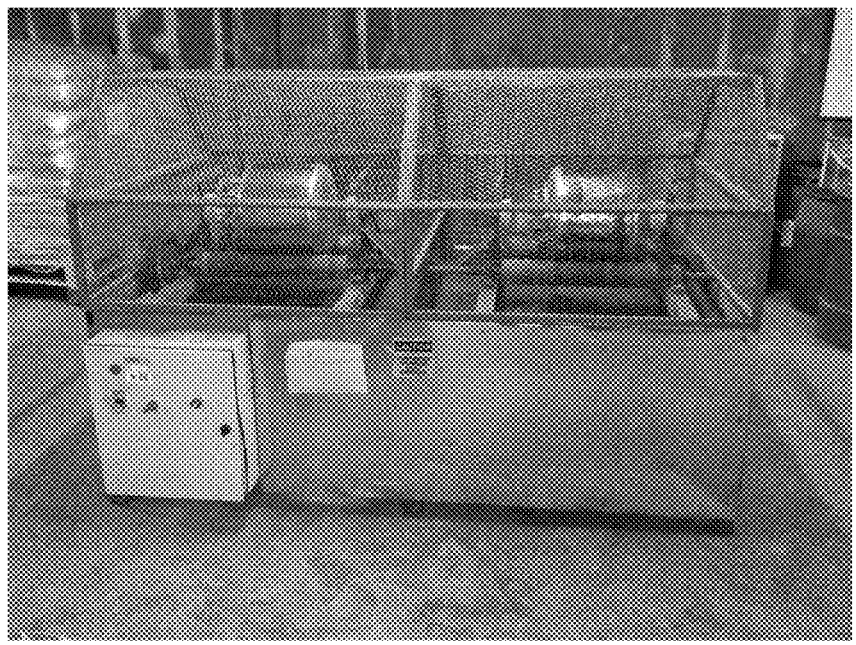
FIG. 4 is a pictorial view of a mechanical ball mill with two mills operating simultaneously.
Figure 5:
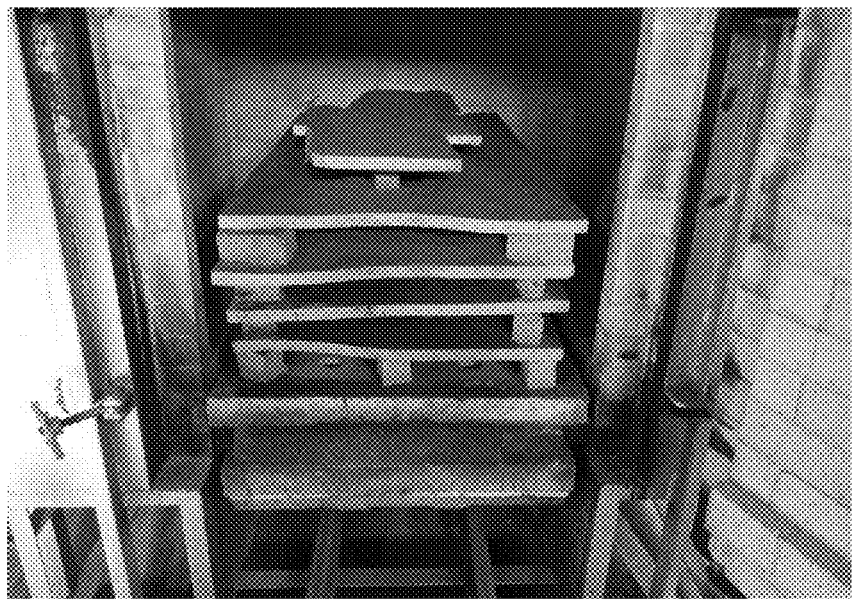
FIG. 5 is an image of ground POFA after oven drying and grinding but before heat treatment in a gas-operated furnace, where the POFA has a black appearance.
Figure 6:
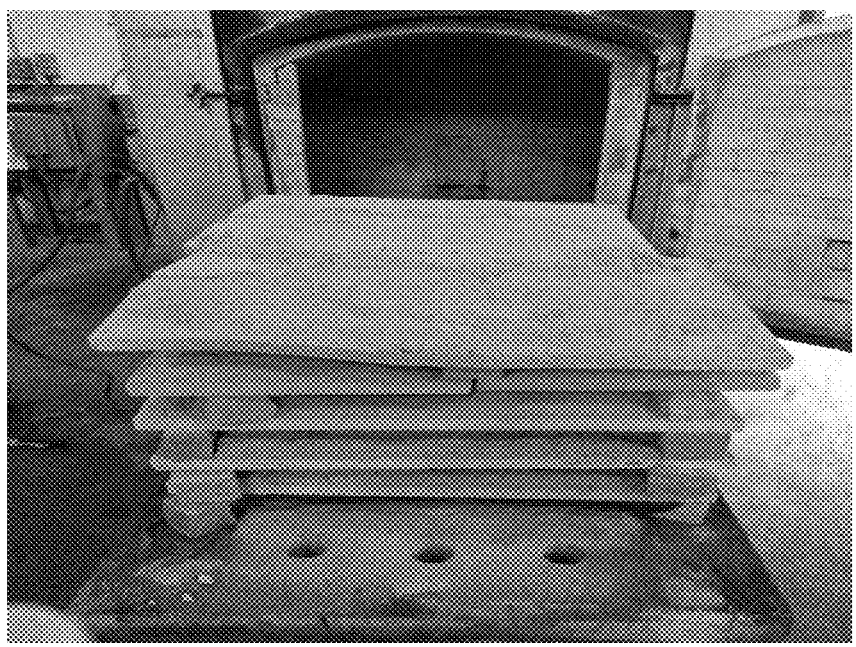
FIG. 6 is an image of calcined POFA (after heat treatment in a gas-operated furnace), where the POFA has a grey appearance.

POFA was the only aluminosilicate source material and was obtained from United Palm Oil Mill Sdn. Bhd. in Nibong Tebal, Penang, Malaysia. It is a by-product from the combustion of empty palm fruit bunches, palm kernel shells and fibers; normally used to heat the boiler for electrical energy generation in the palm oil mill. FIG. 1 shows a typical dumping site for raw POFA, which is a combination of well-burnt ashes and partially burnt palm shells and fibers. The raw POFA particles are predominantly dark in color due to the presence of high carbon amounts from incomplete burning of the residue. To adequately harness the inherent benefits of POFA, POFA was treated to remove unwanted residue following the procedure highlighted in FIG. 2. This was achieved by drying the relatively moist raw POFA in an oven at 100±5° C. for 24 hours, as shown in FIG. 3 to remove the moisture and to allow for ease of particles movement through the sieves. After drying, the dried POFA was sieved through a set of sieves (600 μm and 300 μm) to remove coarser and unwanted materials. Subsequently, after sieving, the sieved POFA was ground by a mechanical ball mill. The mechanical ball mill shown in FIG. 4 has an approximately 7 kg-controlled capacity for each cycle to achieve an efficient grinding of POFA. It holds 150 steel balls of sizes ranging from 6 mm to 32 mm and rotating at speed of 180 rpm. Grinding was done to decrease the particle size of POFA and to increase its surface area, which ultimately led to improved pozzolanic reactivity. At this stage, the POFA material is physically processed but not thermally treated, hence referred to as ground POFA (GPOFA). To remove unburnt carbon, prevent glassy phase crystallization and agglomeration of particles, the ground POFA was heated at 550° C. in a gas-powered furnace for 90 min. After this calcination process, there is a change in color from black (ground POFA, FIG. 5) to grey (calcined POFA, FIG. 6) due to the removal of carbon responsible for the black color. To further improve the surface area and specific gravity, the calcined POFA is ground for another round in the ball mill to provide treated palm oil fuel ash (TPOFA). This is because the particles characterized by low specific gravity have had improved fineness and particle size, hence increased specific gravity. The POFA treatment procedure adopted was due to the highest improvement achieved, which was measured by the least amount of unburnt carbon content. The synthesis of alkali-activation of POFA material will improve because of the carbon content reduction. The loss on ignition (LOI) values reduced from 26% to 2.3% after heat treatment, a sign of low unburned residue in the POFA. The reduction in the LOI value is compensated for by an increase in the mass percentages of other oxides.

The particle size distribution of the final stage of preparation of POFA was determined using Laser Particle Sizer Analysette 22 MicroTec plus particle size analyzer (PSA). The value of the surface area was determined using Micromentics ASAP2020 BET using nitrogen gas adsorption. Table 1 shows the oxide compositions and physical properties of TPOFA and GPOFA, which were determined using X-ray fluorescence (XRF) technique.

With total oxides of silicon, aluminium and iron of 79.07%, the TPOFA complies with the specification of ASTM C618 as class F fly ash (ASTM C618, 2012).

TABLE 1

Chemical compositions and physical properties of TPOFA and GPOFA

| Property | Value | |
| --- | --- | --- |
| Chemical | TPOFA | GPOFA |
| Silicon dioxide ($SiO_2$), % | 66.91 | 62.74 |
| Aluminum oxide ($Al_2O_3$), % | 6.44 | 6.32 |
| Ferric oxide ($Fe_2O_3$), % | 5.72 | 4.87 |
| Calcium oxide (CaO), % | 5.56 | 4.94 |
| Magnesium oxide (MgO), % | 3.13 | 2.51 |
| Sodium oxide ($Na_2O$), % | 0.19 | 0.15 |
| Potassium oxide ($K_2O$), % | 5.20 | 4.69 |
| Sulfur oxide ($SO_3$), % | 0.33 | 0.26 |
| Phosphorus ($P_2O_3$), % | 3.41 | 3.72 |
| LOI, % | 2.3 | 10.13 |
| Physical | | |
| Specific gravity (g/cm$^3$) | 2.53 | 2.87 |
| Median particle size $d_{50}$ (µm) | 1.068 | 2.96 |
| Specific surface area (m$^2$/g) | 1.521 | 1.683 |

Alkaline Activators

A mixed solution of $NaOH_{(aq)}$ and $Na_2SiO_3$ was used as an activator in the developed alkali-activated concrete (AAC). Sodium hydroxide is cheap material and it is widely available, making it a choice activator in the alkaline activation of the precursor material, in this case POFA. However, the corrosive nature of the highly alkaline alkali hydroxides presents handling issues. Commercial grade sodium hydroxide pellets with 97% purity and specific gravity of 2.13 were used in the preparation of sodium hydroxide solution. The $NaOH_{(aq)}$ solution was prepared by dissolving either the flakes or pellets in water. The mass of NaOH solids (flakes or pellets or in a solution) varied depending on the concentration of the solution expressed in terms of desired molarity of the solution. For example, 8M NaOH solution was prepared by dissolving 319.976 g of NaOH (in flake or pellet form) in one liter of distilled water.

Sodium silicate ($Na_2SiO_3$), also known as water glass, was also used in combination with NaOH as an alkali activator. The silica modulus ($SiO_2$-to-$Na_2O$ (or $K_2O$) ratio) varies from 1.5 to 4. The hydrates of $Na_2SiO_3$ have the formula $Na_2SiO_3.nH_2O$ where n=5, 6, 8, or 9. Available water glass has a silica modulus of 3.3 and holds 36-38% solids.

Water

Potable water, whose physiochemical composition shown in Table 2, was used in the developed alkali-activated concrete (AAC).

TABLE 2

Physicochemical analysis of potable water used in the development of AAC

| Parameter | Analytical Method | Limits* | Results |
| --- | --- | --- | --- |
| Color | Spectrometric | 5.0 TCU | <1 TCU |
| Turbidity | Photometric | 5.0 NTU | <1 NTU |
| pH @ 25 deg C. | Electrometric | 5 to 7 | <1 to 7 |
| Chloride | Argentometric | 250 mg/L | <1 mg/L |
| Iron | Photometric (Phematroline method) | 1.0 mg/L | <0.05 mg/L |
| Manganese | Photometric (Persulfate method) | 0.4 mg/L | <0.01 mg/L |
| Sulfate | Photometric | 250 mg/L | <25 mg/L |
| Nitrate | Photometric (Diazotization) | 50 mg/L | <1 mg/L |
| Lead | Direct flame | 0.01 mg/L | <0.007 mg/L |
| Arsenic | Hydride generation | 0.05 mg/L | <0.01 mg/L |
| Cadmium | Direct flame | 0.003 mg/L | <0.002 mg/L |
| Total Dissolved Solids | Gravimetric | 500 mg/L | <6 mg/L |

Limits* means recommended contaminant levels

Aggregate

In the design of an alkali-activated concrete, selection of aggregates is important as most of the matrix volume is occupied by aggregates. The gradation of coarse and fine aggregate (CA and FA) is in accordance with the provisions of ASTM C33/C33M-18 (2018). The FA was dune sand with fineness modulus of 1.85 while total aggregate (TA) had a fineness modulus of 3.66. The FA/TA ratio was 0.45 while the specific gravities of the CA and FA in the saturated and surface dry (SSD) conditions were 2.55 and 2.62, respectively.

The coarse aggregate (CA) used for the AAC was crushed stones composed of sizes 4.75 mm and 2.36 mm, which according to ASTM C33 are size No. 4 and No. 8, respectively. The ratio between the size No. 4 and No. 8 used was 2.

Superplasticizer

A commercially available polycarboxylic ether basedsuperplasticizer (SP), MASTERGLENIUM 51, available from BASF satisfying the ASTM C494/C494M-17 (2017) was used to modify the workability and to achieve adequate rheological properties of the developed alkali-activated concrete. It is a chloride-free super plasticizing admixture.

Mixture Proportioning

AAC with composition shown in Table 3 was prepared with 100% TPOFA, as the binder, with varying coarse aggregate to total aggregate ratios (CA/TA) and fine aggregate to total aggregate ratios (FA/TA) and a constant TA/POFA ratio of 1.8. The alkaline activators used were prepared from a mixture of $NaOH_{(aq)}$ (NH) and $Na_2SiO_{3(aq)}$ (NS) with activator's relative proportion—$Na_2SiO_{3\ (aq)}$/xM $NaOH_{(aq)}$: [x=10, 12 and 14 M]) whose ratios were 2.5, 2 and 1, respectively. The NaOH pellets were measured before dissolution and placed in a beaker depending on the required molarity; distilled water was then added and thoroughly mixed. For instance, 10 M $NaOH_{(aq)}$ is prepared by measuring 399.97 g of NaOH pellets into a beaker and distilled water added to the 1000 ml mark on the beaker. The solution, which is exothermic, is stirred until all the pellets have dissolved and a clear solution is obtained. After preparation, the solution is allowed to cool down to prevent the alkaline activation process from thermal interference from the exothermic $NaOH_{(aq)}$ solution. Based on the alkali activator ratio, the Na$_2$SiO$_{3(aq)}$ solution was added to the measured NaOH$_{(aq)}$ solution and then mixed for several minutes.

TABLE 3

Constituents of the developed AAC.

| Mixture | NS/NH | (NS + NH)/POFA | TA/POFA | FA/TA | CA/TA | Water content |
|---|---|---|---|---|---|---|
| Molarity = 10 M | | | | | | |
| M1 | 2.5 | 0.6 | 1.8 | 0.45 | 0.55 | 15% |
| M2 | 2.5 | 0.4 | 1.8 | 0.45 | 0.55 | 10% |
| M3 | 2.5 | 0.5 | 1.8 | 0.45 | 0.55 | 10% |
| M4 | 2.5 | 0.6 | 1.8 | 0.45 | 0.55 | 5% |
| M5 | 2.5 | 0.6 | 1.8 | 0.45 | 0.55 | 8% |
| M6 | 2 | 0.4 | 1.8 | 0.45 | 0.55 | 8% |
| M7 | 2 | 0.5 | 1.8 | 0.45 | 0.55 | 5% |
| M8 | 1 | 0.4 | 1.8 | 0.45 | 0.55 | 10% |
| Molarity = 12 M | | | | | | |
| M9 | 2.5 | 0.4 | 1.8 | 0.45 | 0.55 | 10% |
| M10 | 2.5 | 0.5 | 1.8 | 0.45 | 0.55 | 5% |
| M11 | 2.5 | 0.6 | 1.8 | 0.45 | 0.55 | 5% |
| M12 | 2 | 0.4 | 1.8 | 0.45 | 0.55 | 10% |
| M13 | 2 | 0.5 | 1.8 | 0.45 | 0.55 | 5% |
| Molarity = 14 M | | | | | | |
| M14 | 2.5 | 0.6 | 1.8 | 0.45 | 0.55 | 5% |
| M15 | 2.5 | 0.6 | 1.8 | 0.45 | 0.55 | 4% |
| M16 | 2 | 0.4 | 1.8 | 0.45 | 0.55 | 11% |
| M17 | 2 | 0.5 | 1.8 | 0.45 | 0.55 | 10% |
| M18 | 2 | 0.6 | 1.8 | 0.45 | 0.55 | 5% |
| M19 | 1 | 0.5 | 1.8 | 0.45 | 0.55 | 10% |
| M20 | 1 | 0.6 | 1.8 | 0.45 | 0.55 | 2% |
| M21 | 1 | 0.6 | 1.8 | 0.45 | 0.55 | 5% |

Concrete Mixing Procedure

An approximate unit weight of between 2200-2300 kg/m$^3$ for the POFA alkali activated concrete is quite comparable to that of typical Portland cement concrete. In the preparation for the POFA alkali-activated concrete matrix, POFA and aggregates (fine and coarse aggregates) were mixed thoroughly in dry condition using a Hobart planetary bench mixer model N50-60 to get a uniform mixture of dry materials. Subsequently, the alkaline activators (a mixture of Na$_2$SiO$_{3\ (aq)}$ and NaOH$_{(aq)}$) were added to the dry materials, mixed for 5 mins and then followed by the addition of water and/or superplasticizer (SP), after which mixing was continued for another 4-5 mins. Intermittently, the mixer was stopped to scrap manually the solid materials sticking to the bottom of the bowl. The mixing continued and stopped when homogeneity and consistency of the concrete mixture have been reached after 1-2 minutes.

Casting and Curing of Concrete Specimens

Different specimen specifications and dimensions were used to test the specimens for compressive, tensile, and flexural strength. For the compressive strength, the mixtures were cast in two layers into 50 mm×50 mm×50 mm oil smeared steel molds. Each layer was compacted on a vibrating table for 1-2 mins after which the fresh POFA alkali-activated concrete (POFA-engineered cementitious composite (EACC)) samples were covered in vinyl bags to prevent moisture loss and left in the laboratory at 25° C. for 24 hours prior to demolding. The specimens were demolded and placed in vinyl plastic bags prior to curing in an oven at 60±5° C. for 24 h. This was to aid in the alkaline activation reaction for early strength increase. After the heat curing, the hardened samples were subsequently allowed to cool down in the laboratory until predetermined ages for the test. The same procedures were adopted to evaluate tensile and flexural strength specimens.

Test Methods

The optimized POFA alkali-activated concrete specimens were prepared and evaluated to determine the following properties according to standard procedures at appropriate curing periods.

i) In accordance with ASTM C1437, the fresh properties (workable flow) of the POFA alkali-activated concrete was determined using a flow table test on 50 mm cube specimens of the POFA alkali-activated concrete.

ii) In accordance to ASTM C39, the compressive strength of 50 mm POFA alkali-activated concrete cube specimens after 7 and 28 days of curing was measured.

Results and Discussion

Fresh Properties of POFA Alkali-Activated Concrete

The fresh properties of the POFA alkali-activated concrete was determined in order to study the effects of water and the commercial superplasticizer (SP) to guide the choice of water or SP in other experimental mixtures. The workable flow spread of concrete was in the range of 110-135±5% for both water and SP, so water was selected due to cost. In addition, the spread values qualify the mixtures for hardened properties evaluation.

Compressive Strength of POFA Alkali-Activated Concrete

The compressive strength of AAC specimens was conducted at three different ages, 3, 14 and 28 days for showing the influence of mixture proportions on the strength development with time (Table 4). In general, for the developed POFA alkali-activated concrete herein, the 28-day compressive strength ranged of 33 MPa to 49 MPa. The compressive strength property was very much dependent on the sodium hydroxide concentration, sodium silicate to sodium hydroxide ratio, alkali activator/POFA ratio, FA/POFA, CA/POFA and the chemical properties of POFA as a binder. It was also seen that the compressive strength increased with an increase in the quantity of POFA, a trend that was evident for all the three ages studied.

TABLE 4

Compressive strength (3, 14, and 28 day, MPa) of the developed POFA-based alkali-activated concrete

| S/No | NS/NH | (DS + NH)/POFA | TA/POFA | FA/TA | CA/TA | 3 days | 14 days | 28 days |
|---|---|---|---|---|---|---|---|---|
| Molarity = 10 M | | | | | | | | |
| M1 | 2.5 | 0.6 | 1.8 | 0.45 | 0.55 | 32.15 | 32.87 | 35.71 |
| M2 | 2.5 | 0.4 | 1.8 | 0.45 | 0.55 | 46.94 | 47.94 | 48.88 |
| M3 | 2.5 | 0.5 | 1.8 | 0.45 | 0.55 | 37.36 | 38.30 | 38.74 |
| M4 | 2.5 | 0.6 | 1.8 | 0.45 | 0.55 | 35.68 | 35.84 | 36.72 |
| M5 | 2.5 | 0.6 | 1.8 | 0.45 | 0.55 | 36.98 | 37.34 | 37.94 |
| M6 | 2 | 0.4 | 1.8 | 0.45 | 0.55 | 31.58 | 32.46 | 37.68 |
| M7 | 2 | 0.5 | 1.8 | 0.45 | 0.55 | 33.42 | 33.48 | 33.92 |
| M8 | 1 | 0.4 | 1.8 | 0.45 | 0.55 | 19.30 | 27.06 | 33.38 |
| Molarity = 12 M | | | | | | | | |
| M9 | 2.5 | 0.4 | 1.8 | 0.45 | 0.55 | 37.84 | 39.10 | 44.58 |
| M10 | 2.5 | 0.5 | 1.8 | 0.45 | 0.55 | 43.14 | 43.70 | 44.14 |
| M11 | 2.5 | 0.6 | 1.8 | 0.45 | 0.55 | 36.80 | 37.38 | 38.94 |
| M12 | 2 | 0.4 | 1.8 | 0.45 | 0.55 | 35.84 | 38.36 | 39.38 |
| M13 | 2 | 0.5 | 1.8 | 0.45 | 0.55 | 36.30 | 38.08 | 38.50 |
| Molarity = 14 M | | | | | | | | |
| M14 | 2.5 | 0.6 | 1.8 | 0.45 | 0.55 | 25.58 | 36.26 | 36.64 |
| M15 | 2.5 | 0.6 | 1.8 | 0.45 | 0.55 | 29.66 | 30.32 | 36.64 |
| M16 | 2 | 0.4 | 1.8 | 0.45 | 0.55 | 25.89 | 30.72 | 34.66 |
| M17 | 2 | 0.5 | 1.8 | 0.45 | 0.55 | 31.44 | 37.04 | 37.70 |
| M18 | 2 | 0.6 | 1.8 | 0.45 | 0.55 | 32.18 | 36.62 | 37.98 |
| M19 | 1 | 0.5 | 1.8 | 0.45 | 0.55 | 28.82 | 32.78 | 34.46 |
| M20 | 1 | 0.6 | 1.8 | 0.45 | 0.55 | 33.50 | 35.24 | 37.14 |
| M21 | 1 | 0.6 | 1.8 | 0.45 | 0.55 | 33.50 | 38.42 | 38.82 |

Merits of the Developed Alkali-Activated Concrete
I. The developed AAC utilizes an agricultural waste material, palm oil fuel ash, dumped on landfills, as the sole binder.
II. With respect to the environment, the palm oil fuel ash (POFA) alkali-activated concrete is sustainable and eco-friendly due to the huge availability of POFA.
III. With respect to United Nation sustainable development goals, the use of POFA significantly reduces the carbon footprint for concrete manufacture because Portland cement is not used as cementitious binder.
IV. The development of the innovative alkali-activated concrete is cheap in comparison with the cost of OPC concrete, which then results in substantial savings in the cost of structural and infrastructural applications.
V. The beneficial use of POFA agricultural wastes in the invention conserves hectares of lands currently used for landfills, allowing the lands to be used constructively, e.g., for the development of roads, buildings etc.
VI. The concrete of the present disclosure proved to have excellent fresh and hardened properties, in some case achieving a compressive strength of almost 50 MPa, making it suitable for most structural applications.

The invention claimed is:

1. Ash-based concrete composition, comprising:
a treated palm oil fuel ash having a median particle size ($d_{50}$) of 0.5 to 2.0 μm, wherein the treated palm oil fuel ash is the only binder present;
a fine aggregate;
a coarse aggregate; and
an alkali activator comprising an aqueous solution of sodium hydroxide and sodium silicate,
wherein the coarse aggregate has a saturated surface dry (SSD) specific gravity of 2.4 to 2.6, and
wherein the treated palm oil fuel ash comprises 66 to 68 wt. % $SiO_2$, 6 to 7 wt. % $Al_2O_3$, 5 to 6.5 wt. % $Fe_2O_3$, 5 to 6 wt. % CaO, each based on a total weight of the treated palm oil fuel ash.

2. The concrete composition of claim 1, wherein the treated palm oil fuel ash is present in an amount of 20 to 30 wt. %, based on a total weight of the concrete composition.

3. The concrete composition of claim 1, wherein the treated palm oil fuel ash has a median particle size ($d_{50}$) of 0.5 to 2.0 μm.

4. The concrete composition of claim 1, wherein a weight ratio of a combined weight of the coarse aggregate and the fine aggregate to the treated palm oil fuel ash is 1:1 to 2:1.

5. The concrete composition of claim 1, wherein a weight ratio of the alkali activator to the treated palm oil fuel ash is 0.3:1 to 0.7:1.

6. The concrete composition of claim 1, wherein a weight ratio of sodium silicate to sodium hydroxide is 1:1 to 3:1.

7. The concrete composition of claim 1, which consists of the treated palm oil fuel ash, the coarse aggregate, the fine aggregate, sodium hydroxide, sodium silicate, and water.

* * * * *